(12) United States Patent
Le et al.

(10) Patent No.: US 6,934,913 B2
(45) Date of Patent: Aug. 23, 2005

(54) GRAPHICAL DATA ENTRY SCREEN

(75) Inventors: Hanh Kim Le, Austin, TX (US);
Gongxian Liu, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 957 days.

(21) Appl. No.: 09/731,650

(22) Filed: Dec. 7, 2000

(65) Prior Publication Data

US 2002/0070980 A1 Jun. 13, 2002

(51) Int. Cl.$^7$ ................................................. G09G 5/00
(52) U.S. Cl. ................ 715/750; 715/818; 715/819; 715/820; 715/507
(58) Field of Search ............................. 345/810, 818, 345/819, 820; 715/507, 780, 818, 819, 820, 829, 508

(56) References Cited

U.S. PATENT DOCUMENTS

| | | | | |
|---|---|---|---|---|
| 4,646,250 | A | | 2/1987 | Childress .................. 364/518 |
| 5,175,813 | A | | 12/1992 | Golding et al. ............ 395/157 |
| 5,450,545 | A | | 9/1995 | Martin et al. .............. 395/700 |
| 6,011,542 | A | | 1/2000 | Durrani et al. ............ 345/156 |
| 6,314,415 | B1 | * | 11/2001 | Mukherjee .................. 706/47 |
| 6,385,655 | B1 | * | 5/2002 | Smith et al. ............... 709/232 |
| 6,564,375 | B1 | * | 5/2003 | Jiang ........................ 717/165 |
| 6,567,822 | B1 | * | 5/2003 | Cudahy et al. ......... 707/104.1 |
| 2002/0035564 | A1 | * | 3/2002 | Wesinger et al. ............ 707/10 |
| 2003/0050976 | A1 | * | 3/2003 | Block et al. ................ 709/203 |

* cited by examiner

*Primary Examiner*—Ba Huynh
(74) *Attorney, Agent, or Firm*—Robert H. Frantz; David A. Mims, Jr.

(57) ABSTRACT

A graphical user interface and method for data entry of a plurality of fields of information in a computer system, such as a web browser interface, using small scrolling and paging of tabular data and entry fields. A JAVA script is employed to produce a form-like user interface in which a user may enter information in fields shown in a graphical user interface ("GUI") window display area. The GUI is provided with a NEXT button which allows the user to indicate that he or she has more data to enter than can be entered in the currently available view of the form in the GUI window display area. The script saves the currently entered data into a set of hidden fields or variables, and provides a new screen with clear fields for additional data entry. By selecting the PREVIOUS button provided by the JAVA script on the GUI, the user may cause the script to recall previously saved data from the hidden fields or variables and to redisplay them so that the user may review or edit previously entered information. The system and method for the graphical user interface is useful for data entry in any environment where user display space is limited, such as within a graphical user interface display window in a web browser or other computer software, or on a small display of a hand held web browsing device such as a web-enabled wireless phone or personal digital assistant ("PDA").

3 Claims, 7 Drawing Sheets

Figure 1

*Prior Art*

*Prior Art*

GRAPHICAL DATA ENTRY SCREEN

BACKGROUND OF THE INVENTION

1. Field of the Invention

This invention relates to the arts of graphical user interfaces for computer based systems for data entry screens and other types of form completion. This invention relates especially to online form completion in which a plurality of fields are to be completed and/or where user interface display area is limited.

2. Description of the Related Art

Graphical user displays on electronic devices such as computers, web browsers, personal digital assistants, and wireless communications devices are common in the art. As these devices become more and more integral to activities in the daily lives of people such as web browsing, word processing, and even making telephone calls, the efficiency and ergonomics of these interfaces are extremely important. A user will quickly notice whether one user interface is easier and quicker to use than another based upon the number of operations required to perform a certain task. Further, the level of "intuitiveness" implemented in the user interface can greatly increase the usefulness and speed with which the user can operate the device.

Many graphical user interfaces follow the same conventions for navigation of and selection of controls on the user interface. Such common graphical user interfaces ("GUI") include windows or frames-type displays in Microsoft's Windows operating system, Unix operating system, IBM's OS/2 and AIX operating systems, Microsoft's Windows CE operating system, Apple Computer's operating system, and many "proprietary" windows-like GUI's on various devices such as PDA's, cell phones, electronic organizers, etc.

Figure 1:
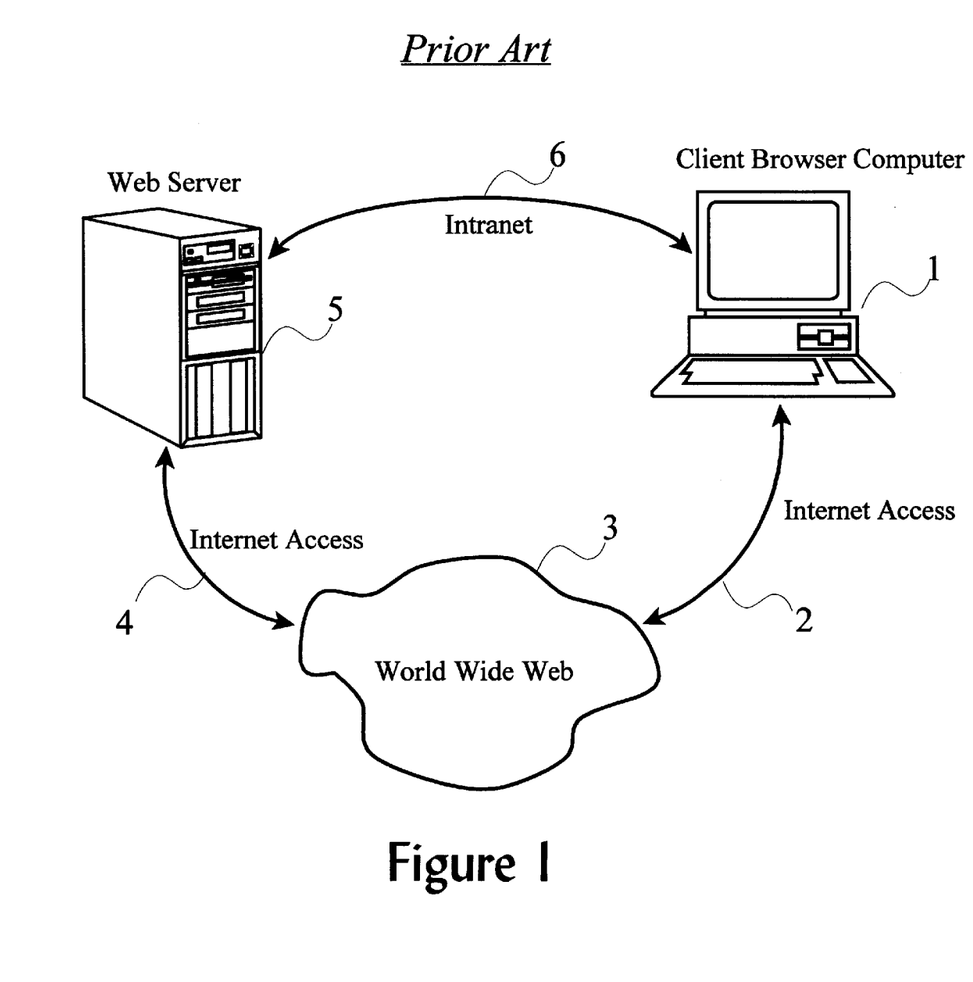
FIG. 1 illustrates the common arrangement of client-server computers, and especially that arrangement over computer networks such as the Internet.

FIG. 1 shows the fundamental client-server arrangement of Internet and intranet communications. A client web browser computer (1) is provided with Internet access (2) to the World Wide Web (3) through common means such as a dial-up telephone line and modem, cable modem, or local area network ("LAN"). The web browser computer (1) is also provided with appropriate web browsing software, such as Netscape's Navigator or Microsoft's Explorer. A web server computer (5) is likewise provided with Internet access (4) to the World Wide Web (3) using similar means, or higher-bandwidth means such as T1 and T3 data lines, and a web server suite of software. Alternatively, client and servers may be interconnected via an Intranet (6), such as a corporate LAN. These arrangements are well known within the art.

Hyper Text Markup Language ("HTML"), Adobe's Portable Document Format ("PDF"), and other web documents provide "hyperlinks" within the document, which allow a user to select another document or web site to view. Hyperlinks are specially marked text or areas in the document which when selected by the user commands the browser software to retrieve or fetch the indicated document. For example, the text:

<A HREF="http://www.patents.ibm.com">VIEW PATENTS</A>when embedded into an HTML document will produce a specially marked or highlighted string of text in the web browser window which simply reads "VIEW PATENTS". Most commonly, this text will appear in underlined blue text, but the HTML document may specify alternate display characteristics for hyperlinks, as well as the web browser may have options for the display of hyperlinks. If the web browser user selects the hyperlink, such as clicking on the hyperlink using a mouse, the web browser will request the base document from web address www.patents.ibm.com using HTTP commands. The appropriate server for this web address will respond to the request by transmitting a web document, such as index.htm, to the requesting web browser.

Ordinarily, when the user selects a plain hyperlink, the current page being displayed in the web browser's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page). The user must click the browser's "back" button to return to displaying the parent page if desired.

Figure 2:
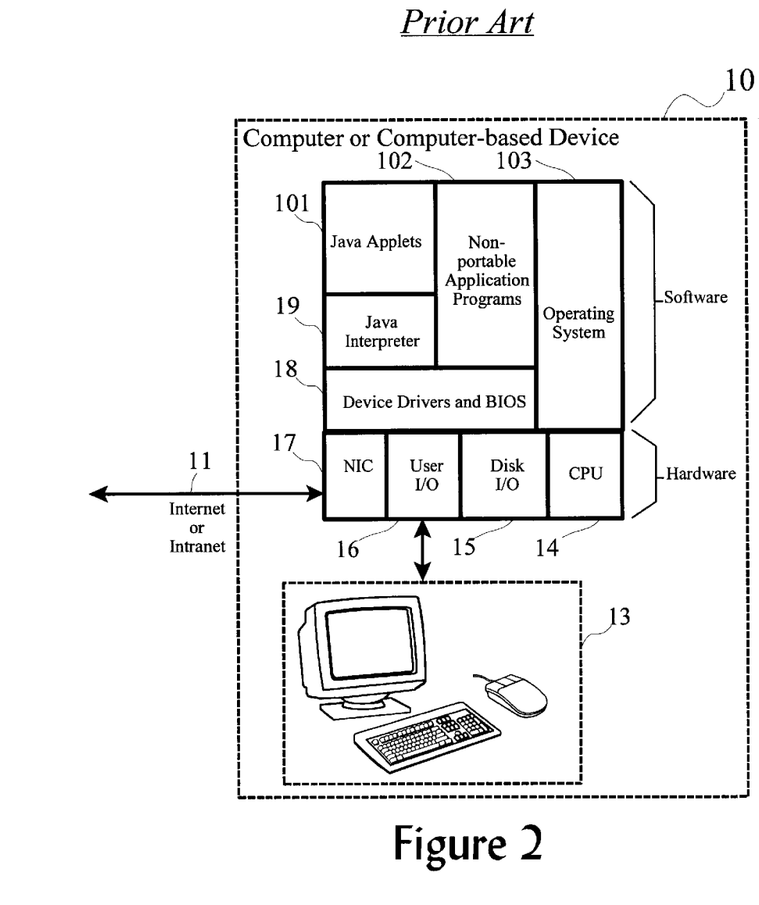
FIG. 2 shows the prior art arrangement of computers and computer-based devices with graphical user interfaces.

FIG. 2 shows the basic organization of many prior art computer systems, web browsers, and other computer-based devices. The system (10) typically includes a microprocessor or central processor unit ("CPU") including computer memory, and may also include interfaces to hard disks and removable disk media (14), and possibly interfaces to computer or communications networks (17) such as a network interface card ("NIC") or wireless communications interface. Commonly used NICs include EtherNet local area network ("LAN") cards, dial-up modem cards, and wireless communications circuits. Some of these circuits may be provided integral to the device (10), such as the case with a web-enabled cell phones, or these circuits may be add-in options such as PCI cards or PCMCIA cards for personal computers.

Additional typical hardware provided in the system (10) includes a group of user input/output ("I/O") devices (13), such as a display, keyboard, and/or pointing device, accompanied by common user I/O interface circuits to allow the CPU and system software to access and use the user 1/O devices (13). Common display devices include VGA and LCD monitors for personal computers, and LCD panels for PDA and cell phones. Common pointing devices include "arrow keys", "tab" keys, mouse and scroll-mouse, joystick, track balls, glide point touch sensitive pads, and touch sensitive displays with stylus pens. Some devices, such as certain PDA's, do not include an actual keyboard, but rather rely upon a touch-sensitive LCD display with virtual pointing device and stylus.

The software functionality of computer-based systems (10) can be divided into low-level device drivers and BIOS (18), an operating system (103), and applications programs. Low-level device drivers provide hardware-specific interface functions which allow the operating system and application programs to access the system hardware through common or generic application program interfaces ("API"). Some device drivers include necessary communications protocols and methods associated with a particular hardware device, such as a modem or wireless communications interface. Application programs can be further divided into portable applications, or applets (101), and non-portable, system-dependent applications (102). Such division of hardware and software functionality is well-understood in the art, and can be applied to large computer systems such as an IBM AS/400 equally as well to small computer systems such as PDA's running Windows CE.

Figure 3:
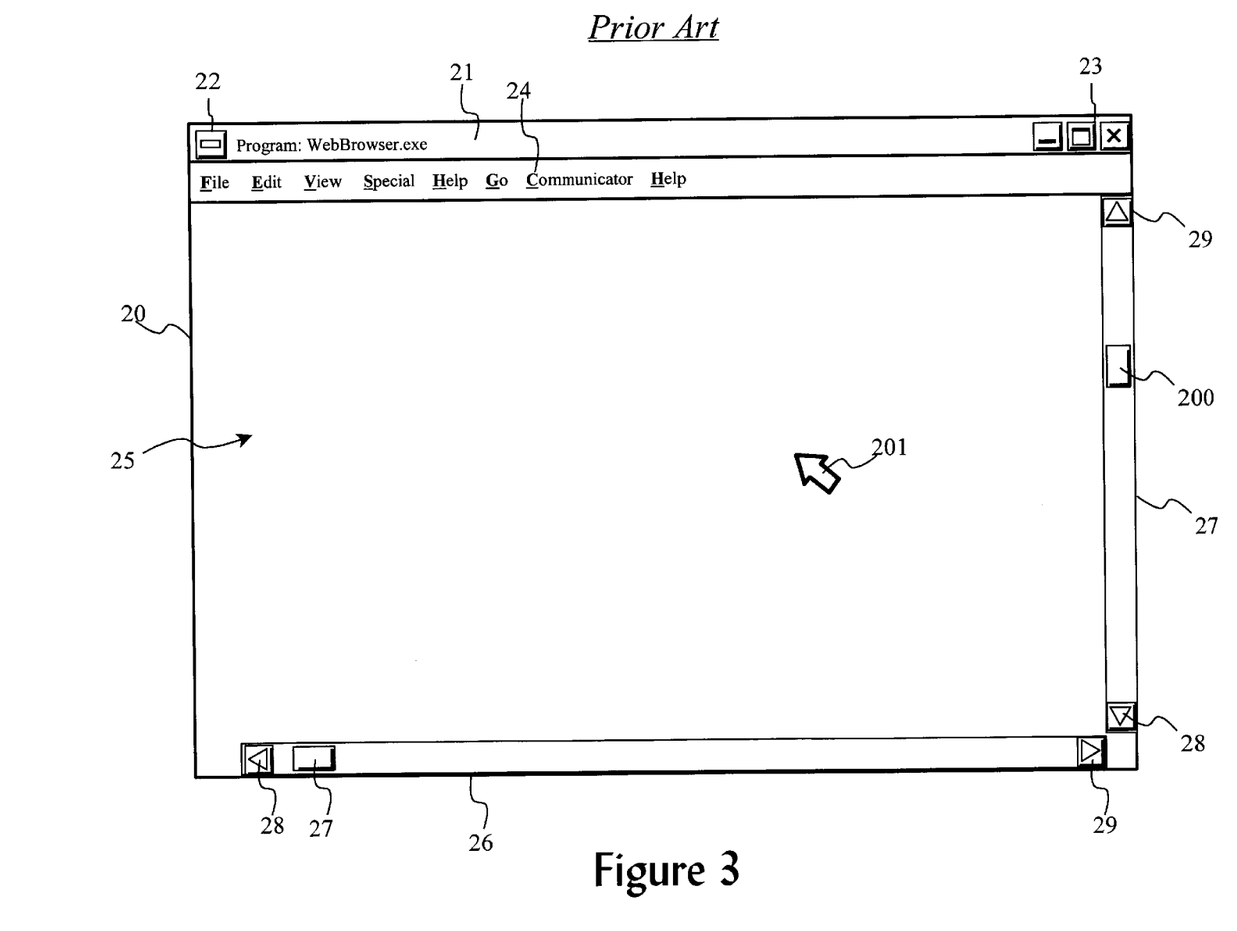
FIG. 3 presents an example GUI frame.

On the system display is typically shown a conventional frame or "window" of information related to a specific system function or program, such as a web browser. FIG. 3 shows a typical arrangement of a web browser frame (20) including a title bar (21), tool bar (24), display area (25), and a pointer (201). The pointer (201) moves in response to the system pointing device and/or keyboard, such as typing on the arrow keys, movement of a mouse, track ball, or joystick. The title bar may include "buttons" for minimizing or restoring the frame (23), closing the program (22), as well as a display of the name of the function or program. The tool bar (24) typically includes a number of text and/or iconic options, such as "file" and "edit" drop-down lists.

The display area may be further navigable using vertical scroll (27) and horizontal scroll (26) bars, which are especially useful for system displays of information which cannot be shown completely within one frame on the display. "Clicking" on the right button (29) or left button (28), or "dragging" the horizontal position indicator (27) causes the information in the display area (25) to be panned or scrolled left or right. Likewise, using the up button (29), down button (28), or vertical position indicator (200) can cause panning or scrolling in a vertical motion. These types of scroll bars are common on word processors, spreadsheets, graphical design packages, and web browsers.

In typical operation of these types of GUI displays, the user moves the pointer (201) to or over a button or text option, and selects that option by clicking on it and/or dragging it. In some cases, keyboard-only navigation or selection is possible by using special combinations of keys, such as ALT-F to select the "file" drop-down menu, TAB and RETURN/ENTER keys, etc. In most computer-based systems, the software functions to coordinate user input selections and output display are provided by the operating system ("OS"), and application programs make calls to these OS functions to get input or to display output.

Figure 4:
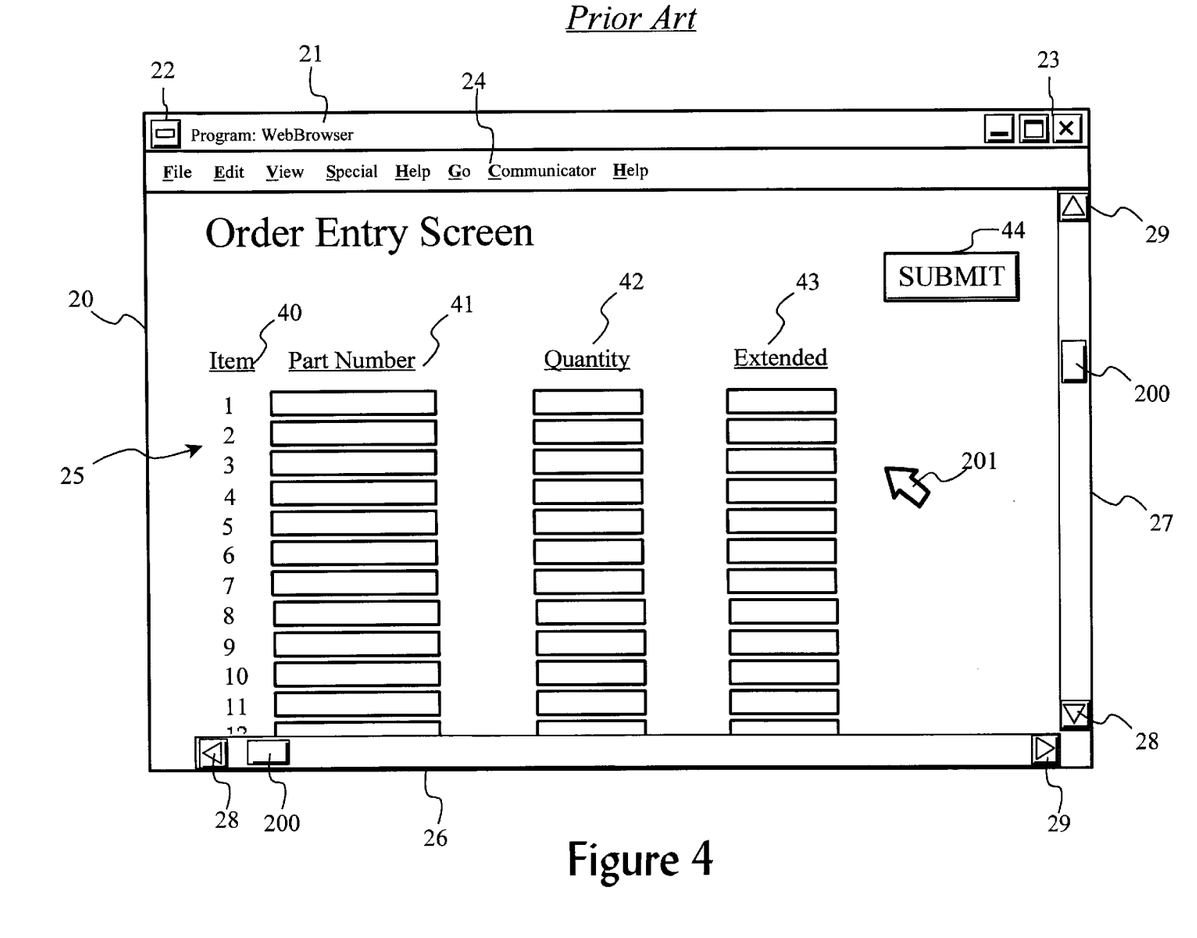
FIG. 4 illustrates prior art method for displaying a form or data entry screen using a scrollable viewing area.

Turning to FIG. 4, an example view of a form with a plurality of fields to be completed is shown. This form is displayed in a web browser window (20) in the display area (25) of the web browser window. In this example, an order entry screen is shown in which each ordered item has an item number (40), a part number or catalog number (41), a quantity of units ordered (42), and an extended calculated price (43). The screen is provided with a submit order button (44). In many common technologies on web servers and web sites today, this form would be an HTML form or a common gateway interface ("CGI") form. When the user has completed filling in numbers and information in the fields of the form, the user clicks on or selects the submit button (44) to cause data to be transferred from his web browser computer to the web site server.

The user may use the pointer (201) and his mouse to select fields by clicking in them and typing in numbers or other needed information. Alternatively, he may use a tab key and a back tab key to move from field to field in many forms. However, graphical user interfaces are have limited display space and size, whether it is on a small device such as a web enabled cellular telephone, or on a larger screen such as a 17-inch or a 19-inch CRT display on a computer system. No matter how much screen space is available, it is conceivable to need to complete a form which has more fields than may be displayable in one display frame. Further, most display frames are adjustable in size by the user such that the user may display multiple frames within his graphic user interface display area, and as such, the user may always reduce the frame size such that the entire form is not visible within the frame.

To provide a solution for this limited display area problem, the common art provides window scroll bars (26 and 27) as shown. Using the scroll bar controls (200), the user may scroll the viewable display area left, right, up or down in order to view other portions of the otherwise unviewable sections of the data entry screen. In some cases, the scroll bars also provide up and down or left and right selectable buttons (28 and 29). Clicking on one of these buttons simply advances the screen to the left, right, up or down one viewable area amount. However, even using these incremental scroll buttons, the common art technology does not intelligently move the screen forwards or backwards such that portions of incomplete fields or completed fields may be shown incompletely displayed. This may cause the user to have to select the scroll controls (200) to make a fine adjustment of the viewing area, causing further inefficiency working with the form.

For those who have used these types of systems, it is a well-known frustration to pan within a large form because of the number of user selections required to make coarse viewing adjustments using the incremental scrolling buttons (28 and 29) followed by fine viewing adjustments using the scroll controls (200), which can take many movements of the hand from the keyboard to the mouse and back to the keyboard. Thus, many systems avoid using very large forms, which would otherwise be a coherent and related set of fields, by separating related information into multiple screens or multiple forms. This approach, however, has its own set of problems in that related information is now entered, displayed, and revised across multiple forms, which causes a difficulty for reviewing or viewing information already completed or collections which must be completed.

Therefore, there is a need in the art for a system and/or method which allows smart scrolling of horizontal row-oriented and vertical column-oriented data entry screens, especially for web browser and web display technologies. There also exists a need in the art for a system and method which provides smart panning or scrolling between columns and rows of data entry fields in a web browser which does not require manual fine adjustment of positioning of the display window in order to allow large forms to be completed in an efficient manner.

BRIEF DESCRIPTION OF THE DRAWINGS

The following detailed description when taken in conjunction with the figures presented herein present a complete description of the present invention.

SUMMARY OF THE INVENTION

The invention provides a graphical user interface for data entry of a plurality of fields of information in a computer system such as a web browser interface. A JAVA script is employed to produce a form-like user interface in which a user may enter a group of information in fields shown in a graphical user interface window display area. The graphical user interface is provided with a NEXT button and a PREVIOUS button, which allow the user to indicate that he or she has more data to enter than can be entered in the currently available view of the form in the graphical user interface window display area.

By selecting the NEXT button, the script saves the currently entered data into a set of hidden fields or variables, and produces a new screen with new fields for additional data entry. By selecting the PREVIOUS button, the user may cause the script to recall data from the hidden fields or variables and to redisplay them so that the user may review or edit previously entered information. The system and method for the graphical user interface is useful for data entry in any environment where user display space is limited, such as within a graphical user interface display window in a web browser or other computer software, or on a small display of a hand held web browsing device such as a web-enabled wireless phone or personal digital assistant ("PDA").

DETAILED DESCRIPTION OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention is preferably realized as a JAVA script for use in a web object such as a hypertext markup language (HTML) page. The JAVA script is executed by the client or browser computer when received with the an HTML page or other web object. JAVA scripts are capable of producing displays to users, of receiving input from users, and of combining those operations to produce a form-like user interface or data entry screen. Further, the JAVA script can perform operations on the data received or input, such as range and value checking, calculations, and format checking. JAVA is a well-known programming language, which is especially useful for web design and web programming. Other languages for programming such as C++, are also alternatives for implementation of the invention, depending on the environment of the graphic user interface to be supported.

Figure 5:
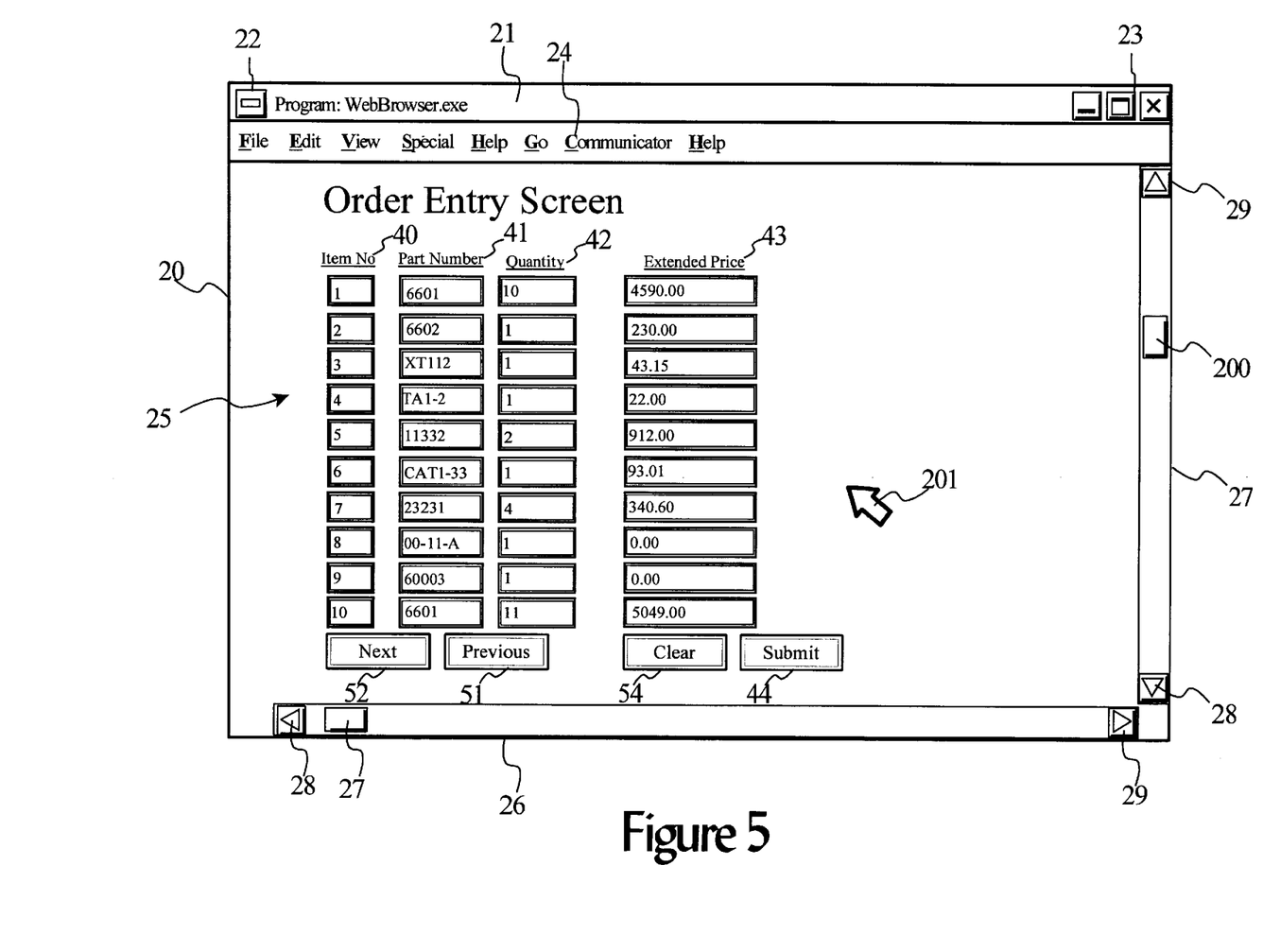
FIG. 5 presents an example of the user interface of the invention for row and column organized data entry fields which uses NEXT and PREVIOUS buttons to intelligently display alternate groups of data fields within a graphical user interface display window area.

Turning to FIG. 5, an order entry screen is given as an example of general data entry using the invention. In this example, a screen which is capable of displaying ten rows of items to be ordered, along with associated columns including the item number (40), the part number or catalog number (41), and the quantity (42) of the items to be ordered. Additionally, a fourth column showing a calculated extended price may be provided 43). In this user interface example, only ten items may be entered in this single screen view because of constraints of the display area. As such, the user can use the pointer (201) or other key strokes, to select a field such as a part number or a quantity to be entered, may type in the appropriate numbers or letters, and press return to finalize entry of the data (or simply select another field).

After the current form has been completed with information for ten items to be ordered, rather than using the traditional scroll bars (26 and 27) or an additional form to continue entering additional items, the user may select the NEXT button (52). This button may be called other names relative to its function, such as MORE, or KEEP SHOPPING, etc.

Figure 6:
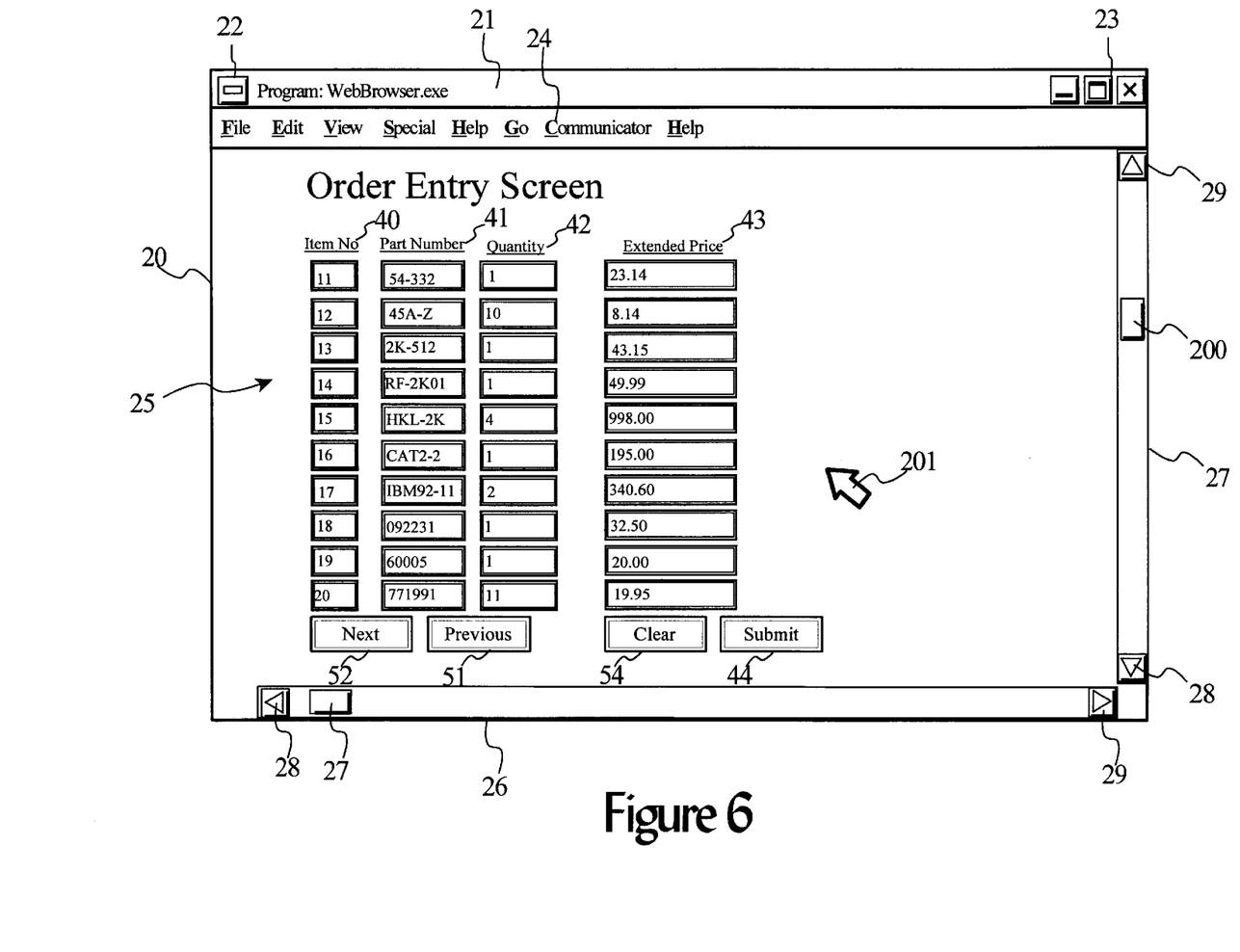
FIG. 6 shows a screen or display advancement from the display of FIG. 5.

According to the preferred embodiment, the JAVA script displays the NEXT button (52) and receives the input when the user selects the NEXT button (52). Responsive to this input, the JAVA script then copies the data for the ten items currently entered in the form into hidden fields or a hidden variable set and reformats the screen for an additional ten items, such as items 11 through 20 as shown in FIG. 6. Additional fields, such as part number and quantity, are preferably cleared to allow for fresh entry of data.

The process of selecting the NEXT button (52) may be repeated as many times as necessary until the user has entered all necessary data, such as all necessary items to be ordered in this example. This allows for an infinite number of items to be entered without the need for a very large form with scroll bars. Additionally, it can be scaled to fit any size display area available, such as three rows or fifty rows, or two columns or twenty columns.

Further according to the preferred embodiment, the JAVA script provides a PREVIOUS button (51) through which the user may select to review and edit previously entered data. Responsive to receiving the PREVIOUS button selection from the user, the JAVA script retrieves data from the hidden fields or variable sets and displays them in the form fields.

Preferably, the form is provided by the JAVA script with a CLEAR button (54) which clears either some or all of the completed data entry fields, and a SUBMIT button (44) which allows the JAVA script to be commanded to transmit (or "post") the entered data to the target or issuing web site or web server.

Figure 7:
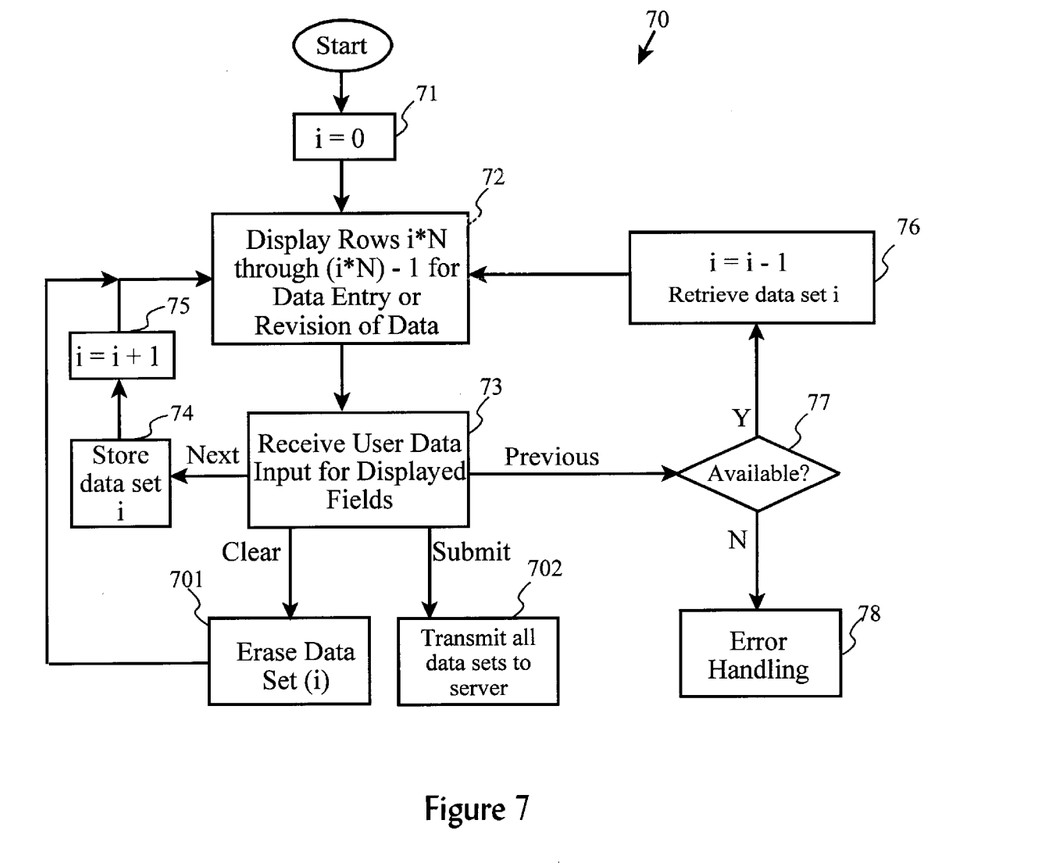
FIG. 7 shows the logical flow of the invention.

Turning to FIG. 7, the logical flow of the invention presented. As described before, the preferred embodiment realizes this logical flow in a JAVA script which is transmitted with or embedded in a web page such as an HTML page. However, many different programming languages could be used to realize the invention depending on the target platform and environment, or the method could be implemented directly into user interface code for other software applications such as database applications.

The system initializes (71) a data set index value such as "i". Then, the first set of N rows is displayed (72) to the user interface for data entry or revision of existing data, where N is the integer number of rows displayed in a single user interface window or view. User data input is then received (73) for displayed fields, and the user may select the NEXT or PREVIOUS buttons as desired. If the NEXT button is selected, the current data set is stored (74) in hidden variable (s), and the data set index "i" is incremented (75). Then, the next set of N rows is displayed (72), and the user may enter data in the new form rows as desired. This process may be continued as long as the user desires to input additional information or data.

If, during entry of data, the user selects the PREVIOUS button, the data set index "i" is decremented and the previous data set is retrieved (76). Then, the previous set of rows of fields is displayed (72) with the data set for revision of existing data. If no previous data set is available (77), the system preferably performs error handling (78).

If the user selects the CLEAR button, which is provided in the preferred embodiment, the current data set information is erased (701) or reinitialized by the JAVA script, and the fields in the user interface window are cleared and re-displayed (72).

If the user selects the SUBMIT button, as provided in the preferred embodiment by the JAVA script, then all the data sets which have been collected are transmitted (702) or "posted" to the server.

It will be understood from the foregoing description that various modifications and changes may be made in the disclosed preferred embodiment of the invention without departing from its true spirit and scope, such as the use of alternate programming methodologies or languages, alternate computer platforms and software, operating systems and user control objects. It is intended that this description is for purposes of illustration only and should not be construed in a limiting sense. The scope of this invention should be limited only by the language of the following claims.

What is claimed is:

1. A method for interfacing with a user of a networked client computer system having a graphical user display, said computer having a user input and selection device, the method comprising the steps of:

transmitting a client-side data entry script to said computer system;

responsive to receipt and execution of said client-side script, providing a plurality of rows of fields and a "next" button on said graphical user display, said fields and "next" button being selectable using said selection device, said number of rows of fields being dynamically determined by said script as the maximum number of entire, integral rows which can be displayed on said graphical user display without causing any partial fields to be displayed;

receiving input data for one or more of said fields via operation of said user input device;

responsive to selection of said "next" button, storing a set of user input in a hidden set of fields and clearing said displayed rows of fields of current input data such that said user may proceed indefinitely with entry of an unlimited amount of additional input data reusing the same set of rows of fields until the user indicates all data has been entered;

providing a "previous" button on said graphical user display, said "previous" button being selectable using said selection device; and responsive to selection of said "previous" button, retrieving a previously stored data set and displaying said previously stored data set such that a user may review previously entered input data.

2. A computer-readable medium containing computer code for interfacing with a user of a networked client computer system having a graphical user display, said computer system having a user input and selection device and a processor capable of executing computer code, the computer code causing the computer system when executed by the processor to perform the steps of:

receiving a client-side data entry script by said client computer system;

executing said client-side script by said client computer system;

providing by said script a plurality of rows of fields and a "next" button on said graphical user display, said fields and "next" button being selectable using said selection device, said number of rows of fields being dynamically determined by said script as the maximum number of entire, integral rows which can be displayed on said graphical user display without causing any partial fields to be displayed;

receiving by said script input data for one or more of said fields via operation of said user input device;

responsive to selection of said "next" button, storing by said script a set of user input in a hidden set of fields and clearing said displayed rows of fields of current input data such that said user may proceed indefinitely with entry of an unlimited amount of additional input data reusing the same set of rows of fields until the user indicates all data has been entered;

providing by said script a "previous" button on said graphical user display, said "previous" button being selectable using said selection device; and responsive to selection of said "previous" button, retrieving by said script a previously stored data set and displaying said previously stored data set such that a user may review previously entered input data.

3. A user display for entering a plurality of input data on a networked client computer system, said computer system having a processor suitable for controlling a user display and retrieving input from a user input device, a user selection device, and a network interface, said user display comprising:

a quantity of rows of user input fields displayed in a graphical user display area, said quantity of rows of input fields being determined by a script received via said network interface and being equal to a number of rows which can be displayed in display area without causing partial rows or partial fields to be displayed;

a "NEXT" button operable by said user selection device;

an input storing function for storing user-input data in the rows of user input fields into hidden fields responsive to operation of said "NEXT" button such that a user may store an unlimited quantity of user input data and continue indefinitely to enter an unlimited amount of additional input data reusing the same set of rows of fields until the user indicates all data has been entered;

a "PREVIOUS" button operable by said user selection device; and an input recalling function for recalling previously stored data in the user input fields from hidden fields responsive to operation of said "PREVIOUS" button such that a user may recall a quantity of user input data.

* * * * *